(12) United States Patent
Ely

(10) Patent No.: US 10,963,577 B2
(45) Date of Patent: *Mar. 30, 2021

(54) SECURE COMPUTING SYSTEM

(71) Applicant: CUPP Computing AS, Oslo (NO)

(72) Inventor: Omar Nathaniel Ely, Paris (FR)

(73) Assignee: CUPP Computing AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,403

(22) Filed: Dec. 3, 2019

(65) Prior Publication Data

US 2020/0104516 A1 Apr. 2, 2020

Related U.S. Application Data

(63) Continuation of application No. 16/230,508, filed on Dec. 21, 2018, now Pat. No. 10,496,834, which is a continuation of application No. 15/707,936, filed on Sep. 18, 2017, now Pat. No. 10,162,975, which is a continuation of application No. 13/822,847, filed as
(Continued)

(51) Int. Cl.
*G06F 21/60* (2013.01)
*G06F 21/64* (2013.01)
*G06F 21/78* (2013.01)

(52) U.S. Cl.
CPC .......... *G06F 21/606* (2013.01); *G06F 21/64* (2013.01); *G06F 21/78* (2013.01)

(58) Field of Classification Search
USPC .......... 726/26, 2, 21, 36; 713/150, 163, 181; 380/255, 264, 276
See application file for complete search history.

(56) References Cited

U.S. PATENT DOCUMENTS

| 6,931,503 B1 * | 8/2005 | Robb | G06F 21/80 |
| | | | 711/100 |
| 2004/0103288 A1 * | 5/2004 | Ziv | H04L 9/0894 |
| | | | 713/185 |

(Continued)

FOREIGN PATENT DOCUMENTS

| DE | 102005029887 | 1/2007 |
| EP | 0560277 | 9/1993 |

(Continued)

OTHER PUBLICATIONS

International Application No. PCT/NO2011/000303, International Search Report dated Jan. 31, 2012.

(Continued)

*Primary Examiner* — Sharif E Ullah
(74) *Attorney, Agent, or Firm* — Sheppard, Mullin, Richter & Hampton LLP

(57) ABSTRACT

A computer system with multiple security levels, the system comprising a high-power processing device (130), a low-power processing device (110), and an interface unit (120) comprising functions for moving classified information between the high-power device (130) and the low-power device (110) according to formal rules for confidentiality and/or integrity. Additional security aspects, e.g. availability, may readily be accommodated. A method for implementing multiple levels of security along a number of independent security axes on the system is also disclosed.

28 Claims, 3 Drawing Sheets

Related U.S. Application Data application No. PCT/NO2011/000303 on Oct. 25, 2011, now Pat. No. 9,767,297.

(56) References Cited

U.S. PATENT DOCUMENTS

| | | | | |
|---|---|---|---|---|
| 2007/0226493 | A1* | 9/2007 | O'Brien | G06F 21/572 |
| | | | | 713/166 |
| 2008/0163359 | A1* | 7/2008 | Conti | G06F 21/79 |
| | | | | 726/17 |
| 2009/0055655 | A1 | 2/2009 | Ziv | |
| 2009/0113542 | A1* | 4/2009 | Price | H04L 63/20 |
| | | | | 726/15 |
| 2009/0119502 | A1 | 5/2009 | Ziv | |
| 2009/0119517 | A1 | 5/2009 | Ziv | |
| 2009/0254572 | A1* | 10/2009 | Redlich | G06Q 10/06 |
| 2010/0049974 | A1* | 2/2010 | Winjum | H04L 63/105 |
| | | | | 713/166 |
| 2011/0035603 | A1 | 2/2011 | Ziv | |
| 2011/0167489 | A1 | 7/2011 | Ziv | |

FOREIGN PATENT DOCUMENTS

| | | |
|---|---|---|
| EP | 1850265 | 10/2007 |
| WO | 9959049 | 11/1999 |
| WO | 2005109302 | 11/2005 |
| WO | 2008127124 | 10/2008 |

OTHER PUBLICATIONS

International Application No. PCT/NO2011/000303, International Preliminary Report on Patentability dated Feb. 26, 2013.

Norwegian Patent Application No. 20101464, Search Report dated May 26, 2013.

*Cupp Cybersecurity, LLC and Cupp Computing AS* v. *Trend Micro, Inc., Trend Micro America, Inc., and Trend Micro Incorporated*, Case No. 3:20-cv-03206-K, Complaint for Patent Infringement, filed Oct. 20, 2020, 99 pages.

* cited by examiner

SECURE COMPUTING SYSTEM

CROSS-REFERENCE TO RELATED APPLICATIONS

The present application is a continuation of U.S. patent application Ser. No. 16/230,508, filed Dec. 21, 2018 and entitled "Secure Computing System," now U.S. Pat. No. 10,496,834, which is a continuation of U.S. patent application Ser. No. 15/707,936, filed Sep. 18, 2017 and entitled "Secure Computing System," now U.S. Pat. No. 10,162,975, which is a continuation of U.S. patent application Ser. No. 13/822,847, filed Jun. 19, 2013 and entitled "Secure Computing System," now U.S. Pat. No. 9,767,297, which is a national stage application pursuant to 35 U.S.C. § 371 of International Application No. PCT/NO2011/000303, filed Oct. 25, 2011 and entitled "Secure Computer System," which are hereby incorporated by reference herein.

BACKGROUND

1. Field of the Invention

The present invention concerns a computer system with multiple security levels.

2. Background of the Invention

Personal computers are widespread, and commonly and increasingly used on the Internet for banking, entertainment, social purposes etc. The average user can not be expected to have a high level of technical knowledge in general, or in the field of computer security in particular. Hence, criminal activities such as fraud and theft are facilitated by more or less protected personal computers. Currently, much attention is given to the actions of malicious software, malware for short, such as viruses, spyware etc., which may be used for taking control over remote computers, keeping track of a user's actions in order to obtain passwords and the like. Some malware, such as software used to track which websites the user visits in order to send targeted spam, may not be directly criminal. However, it may be a nuisance, and in some cases may slow down or even halt a computer. Hence, any kind of malware is undesired.

Today, antivirus software from a variety of vendors provides the main defence against malware. Antivirus software typically scan software for snippets of known virus code, and usually also provide filters to detect web pages trying to trick a user into entering information such as password or a credit card number and pass on the information (phishing). Antivirus software may also use a number of other techniques in order to discover, isolate and/or remove malware.

Many of the tools used for protecting personal computers are inadequate in that they are reactive, e.g. search for malware after the PC has been infected, they may perform post mortem analysis etc.

It is well known from e.g. the military, governmental and financial sectors that security must be built into the systems architecture from the start in order to obtain a truly robust and secure system, be it a computer system, an organizational system or any other system. The mathematical foundation for such secure systems was formulated in the 1970's primarily by Bell and LaPadula for confidentiality, and by Biba for integrity. A brief overview of these models is useful in order to explain the invention.

Brief Overview of Formal Security Models

Security is frequently defined as a combination of the security aspects confidentiality, integrity and availability. In this disclosure, the term 'security' is defined in a similar manner. However, it is noted that there may be several aspects of integrity, and that there may be no clear distinction between certain integrity and availability aspects. It should also be understood that all aspects of security herein are independent of each other, i.e. that a security aspect that can be expressed as a combination of other security aspects is not considered a separate security aspect.

Confidentiality means that information should not be disclosed to someone not entitled to know it. In the Bell-LaPadula (BLP) model, a confidentiality level is assigned to an information object such that a higher level implies more confidentiality. A 'subject', e.g. a person or process, is given a clearance at a certain confidentiality level. The information object may only be written to a subject having a clearance at or above the confidentiality level of the information object. In other words, 'writing down' to a less confidential level is not permitted, whereas 'writing up' is allowed in the BLP model. Further, if two information objects with different confidentiality levels are combined, e.g. present in one document, the combination is assigned the higher of the two levels of confidentiality. While information may be written up, it cannot be written back to a lower level without violating the model. This also applies to a combination of information by the combination rule. Thus, in order to avoid information from migrating to the highest possible confidentiality level and having to treat a lot of public information as if it was confidential, writing up should thus still be kept at a minimum. The BLP model can be extended with categories or compartments implementing the 'need to know' principle. For example, a company may decide not to grant access to salaries to every employee with a clearance for CONFIDENTIAL, but only to those who in addition belong to a certain category, e.g. SALARIES.

Integrity essentially concerns the trustworthiness or reliability of information. Biba's strict integrity model, 'the Biba model' for short, is similar to the BLP model in that information is assigned a level of integrity and in that a subject is assigned a clearance. A high level of integrity is associated with reliable and trustworthy information and/or subjects. However, unreliable information should not be allowed to mix with reliable information at a higher integrity level, as the information at the higher level then would be no more reliable than the least reliable information written to it. Hence, the Biba model differs from the Bell-LaPadula model in that writing up is forbidden, writing down is allowed and in that a combination of information from two levels of integrity is assigned the lower level. Like the Bell-LaPadula model, the Biba model can be extended with compartments, and although writing down is allowed, it should be kept to a minimum in order to prevent information from migrating to the lowest available integrity level.

Some security models combining integrity and confidentiality assume that a subject with access to confidential information, i.e. with a 'high security clearance', automatically should have a 'higher integrity level' than someone with a lower 'security clearance'. This is a confusion of terms. In this disclosure, integrity and confidentiality are regarded as completely independent of each other. This complies with current theory, and means that information may be more or less reliable regardless of its level of confidentiality, and that a computer process may be assigned clearance along a confidentiality axis regardless of its assigned clearance along an integrity axis. Hence, a trusted process with the highest available confidentiality level and lowest possible integrity level will be able to see or read all information in a security system, but it will not be permitted to write any information to lower levels of confidentiality and/or higher levels of integrity. On the other hand, a process run on the lowest available confidentiality level and highest available integrity level will be able to write information to every level of confidentiality and integrity, but it will not be allowed to receive any information from other levels.

Information Security and Networking

In order to protect confidential information from being disclosed to un-authorized subjects, the information may be encrypted by some cryptographic algorithm using a key. Obviously, there is rarely a real need for encrypting a cake recipe or other trivia to the same level as top secret military information. However, some systems, for example some so-called Virtual Private Networks, do encrypt all messages to the same level regardless of content. To keep the required system resources (and expenses) at a reasonable level, such systems typically encrypt the information to a level appropriate for some medium level of confidentiality. Hence, information assigned a higher level of confidentiality is not permitted to enter such systems without additional encryption. Still, system resources are wasted on encrypting public information, or on encrypting information that has already been encrypted by a more advanced and demanding algorithm. The skilled person will know that different levels of confidentiality can be assigned different encryption algorithms and/or keys of different length in order to encrypt information according to its level of confidentiality. The skilled person will also know that the task of keeping confidentiality levels apart may be more demanding than simply encrypting everything to some medium level of confidentiality.

An important aspect of integrity is to ensure that information and the subject accessing it are authentic. Thus, authentication is needed to ensure that a user or process is the one he, she or it claims to be, for example the user or process initiating a banking transaction from a bank account. In the financial industry, a token or RSA-generator plus a personal password and/or other personal data may be required to identify a person properly before he or she is permitted access to a banking application. Similarly, a certificate or the like may authenticate a computer process.

One technique to prevent unauthorized alteration involves computing a cryptographic checksum called a hash. For example, a hash can be computed from a piece of software code and stored in a protected area. At runtime a new hash is computed and compared to the stored hash. If the two hashes are different, the code is not allowed to run. Hashing is also used to protect information from unauthorized alteration (tampering) in transit, e.g. to ensure that no one alters an account number and/or amount in a banking application. The HTTP Secure protocol (https) implements authenticity in this manner, and is widely used for banking applications and other transmissions over the Internet where integrity is important. It should be noted that while encryption may ensure some level of integrity in human based systems, it does not ensure authenticity in a computer system. The reason is that a person readily may recognize a decrypted altered message as garble. Then, if a decrypted message is readable, it probably has not been altered, and the sender may be assumed to be authenticated since he must have the proper key to encrypt the message. A computer process receiving a similar decrypted altered message cannot be expected to recognize the resulting content as garble. Consequently, no conclusion regarding tampering or sender should be made. In short, a hash may preserve integrity while encryption does not preserve integrity. Likewise, encryption may preserve confidentiality while a hash does not preserve confidentiality.

Current computer systems with functionality and architectures supporting the Bell-LaPadula model include, but are not limited to, Solaris version 10 and later, all current Linux distributions as well as secure proprietary systems used for military and governmental applications. In transfer, confidential information may be encrypted with algorithms of various complexity and keys of various lengths according to the confidentiality level of the information in transfer: Current Linux and Solaris systems do have some functions for integrity, for example a password system or a 'smart card' system for user authentication, the ability to check a hash before running an application (authenticity) and functions for other integrity aspects. Some of the functions related to integrity are implemented in hardware or kernel software, other functions are implemented by third party application software.

Functions for the third security aspect, availability are typically implemented by third party tools, e.g. application layer backup- or system recovery tools, or vendor specific disk-redundancy tools. We note that so called flooding attacks sometimes are regarded as threats against availability. They may equally well be regarded as unauthorized writes, and may as such be regarded as an integrity threat. Regardless of the terms used, we note that rules similar to Bell-LaPadula's and Biba's can be employed along a number of axes, some of which may be termed an integrity aspect or an availability aspect, but still be treated according to either the BLP or the Biba rules described above.

At least some of the threat posed by malware may be attributed to lack of system support for formal security models. If, for example, confidentiality or integrity is enforced such that an external process is unable to write into a restricted area, then a virus could not contaminate application software. Further, if a hash must be computed at runtime and required to be identical to an authenticated hash stored in a restricted area, then harmful code could automatically be prevented from running, in particular in restricted areas.

Thus, the effects of malware could be reduced or even eliminated if the formal security models were enforced.

However, a strict enforcement of security poses new problems. One example is an integrity control where a user is required to add each and every web page he or she visits to a list of 'trusted' pages. Considering the number of web pages visited by the average user, this quickly causes the user to automatically add web pages to the list. After some time, the user may even disable this 'security' function to get rid of the perceived nuisance. It is readily seen that this kind of integrity control has little or no effect, and that the user cannot be depended on to adequately assess integrity and/or confidentiality.

Another problem is cost. Today, even starting from a Solaris system which implements many of the required functions and which has a lot of verified code, developing and verifying even a relatively simple system for business use, can easily cost several millions of dollars. Starting from a Linux system, obtaining the necessary certification for the code adds to the cost before a trusted system would be put into business use, let alone military or governmental applications.

An important reason for the high cost is the use of unordered compartments in the formal Bell-LaPadula and Biba models. Given a set of N unordered 'security compartments', i.e. security related groups to which a user or process can belong, a superset of $2^N-1$ elements must be considered in a mathematically ordered and controllable set. For example, if a user can belong to groups A, B, and/or C, the superset of $2^3$ elements a user can belong to is [O, {A}, {B}, {C}, {A, B}, {A, C}, {B, C}, {A, B, C}]. Formally, a user must have the proper security clearance AND belong to {A}, {A, B}, {A, C} or {A, B, C} in order to access information in compartment A. The empty set O, where a user belongs to none of the groups A, B or C is usually excluded from implementation for obvious reasons. The ordered superset is considered a subset of each of L security levels. Thus, a secure system must consider $L(2^N-1)$ ordered levels along an axis of security, e.g. the confidentiality axis. In current systems, the number of possible confidentiality levels can be e.g. L=65536 or larger, and the number of available compartments may also be, for example, N=65536 or larger. This may seem like large numbers, but a few tens of thousand compartments in a system with several hundred of thousand users may still be too small. In the present context, however, the number of available levels along each axis will typically be L=3 or less, and the number of compartments may easily be reduced to a few or even 1 as explained below.

It should be understood that the various groups created in a typical operating system for personal computers may have different purposes, and do not necessarily have formal security significance. For example, a substantial number of the groups a user can belong to in a typical PC system will only contain public information with unknown reliability. Further, the rights assigned to processes in a PC system are many, various and can hardly be seen to constitute a formally complete set of rights associated with formal security. Thus, the number of formal security compartments is not large in a typical PC-environment in general. In a secure environment running machines at different levels, a virtual machine's 'need-to-know' is expected to be limited, and hence the number of security compartments is expected to be low, for example 1 per virtual machine.

State of the Art

As mentioned above, some operating systems, for example current Linux distributions and some UNIX-based systems, include security functions that employ techniques implementing the formal security models. One such technique is, as briefly mentioned above, to use a hashing algorithm to provide and store a hash of software during installation, calculate a new hash at runtime and only permitting the software to run if the runtime hash is identical to the stored hash. Another technique is to run applications in a "compartment" or "sandpit" isolated from other software running on the system. Running an entire operating environment on a virtual machine provided by a hypervisor system may be viewed as a variety of the sandpit-technique. There are other techniques known to those skilled in the art, all of which may be used with the present invention. In this disclosure, the term "operating environment" includes any operating system and/or hypervisor system capable of running computer applications, including different operating systems and user interfaces.

Known systems for implementing security in a low power system include the use of a processor and certificates and/or keys embedded in a plastic card the size of a credit card. Such cards may be inserted into a card reader connected to a computer. The card reader may be connected through a systems bus or a peripheral bus like, e.g., a Universal Serial Bus (USB). Such security cards have no internal power source, and electric power is supplied from a running system through the card reader. Further, the processing capability of such a card make it unsuitable for running computing intensive routines like, for example, hashing, encryption or booting a kernel in an operating environment. Usually, the card reader also depends on a driver supplied by a running operating environment. Hence, such card based systems are normally used for high-level security functions such as providing a certificate or key for verification, hashing and/or encryption in applications running within the operating environment.

From a security perspective, such card systems are still prone to various threats against confidentiality, integrity and availability. In particular, malware may infect the operating system and/or applications during startup (boot) or operation. Such malware might, at least in theory, steal the smartcard's keys or certificate, or mimic the driver to authorize something that would not be authorized by the smart card. This possibility renders the smart card unreliable from a formal integrity point of view.

An objective of the present invention is to provide a system capable of providing security related functions and data without requiring a running operating environment. In particular, the system may contain hashes of installed software, for comparison before software, possibly including kernel functions of an operating system, is allowed to run on the system. The system may also contain keys and other data, and be able to run security related routines without requiring external processing power or a running operating system.

Another objective of the present invention is to provide a computer system consistent with formal rules for confidentiality, integrity and availability, which system does not depend on a user's discretion and which hamper a user's activities as little as possible.

SUMMARY OF THE INVENTION

According to the invention, this is achieved by providing a computer system with multiple security levels, the system comprising a high-power processing device, a low-power processing device, and an interface unit comprising functions for moving classified information between the high-power device and the low-power device according to formal rules for confidentiality and/or integrity.

In another aspect, the invention discloses a method for implementing multiple levels of security on such a computer system.

The low-power device provide means for running software and keeping security data at the highest possible integrity level to which no data or foreign code can be written through normal software routines. This is ensured by providing the secure data and code in firmware or hardware that can only be altered by a physical device for hardware programming. The low-power device may in some instances not even provide an interface for hardware programming.

The low-power device may also provide facilities at lower integrity levels, making it possible to write certain data to clearly defined areas of the device, using e.g. firmware implemented functions for reads and writes, taking the formal rules for integrity into consideration, i.e. writing up is prohibited while writing down is permitted.

Similar functionality may be implemented with regards to confidentiality levels, where writing up is permitted and writing down is forbidden.

Some data within the highest integrity level can have a low confidentiality level, i.e. the availability for being read by every software component in the high-power system, e.g. kernel functions of various kinds. Other data within the highest integrity level, for example some keys for encryption, may have a higher confidentiality levels and thus can only be read from software running at an appropriate confidentiality level and a lower integrity level.

BRIEF DESCRIPTION OF THE DRAWINGS

The invention will be explained in the following detailed description with reference to the accompanying drawings, in which like reference numerals refer to similar elements throughout the figures, and in which.

DETAILED DESCRIPTION

Figure 1:
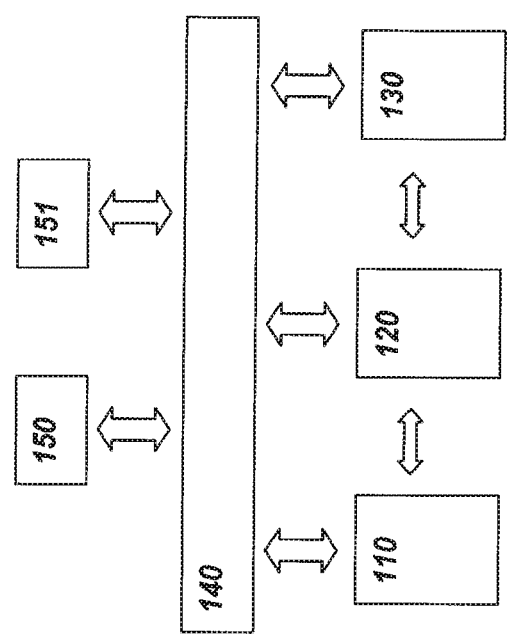
FIG. 1 is a schematic view of a system according to the invention.

FIG. 1 illustrates a computer system comprising an autonomous low-power device 110, an interface unit 120, and a high power system 130. Peripheral devices 150, 151 are connected through a bus 400.

The high-power system 130 typically comprises the circuits and devices found in a typical computer capable of running operating environments like, for example, Linux, Mac-OS, Unix, VM-ware and/or Microsoft Windows. It is noted that "high-power" refers loosely to the processing power, and not the electrical power required for running the machine. Indeed, some computers capable of running a common operating environment with a suitable user interface are designed for use on batteries and thus have relatively small electrical power consumption. Such systems are still included in the term "high power systems" 130 as used herein.

The autonomous low-power device 110 of the system in FIG. 1 is an auxiliary system capable of booting from hardware and/or firmware that cannot be modified through the operating system on the high power device, simply because there is no hardware for modifying them.

The hardware and/or firmware in the low-power device can preferably be written from a hardware programming interface only, and is typically implemented solely in microelectronic chips, ASICS, Field Programmable Gate Arrays (FPGAs) and similar devices. A typical implementation would use readily available programmable hardware like, for example, an ARM-system. The main purpose of the low-power device in the present context is to contain security related instructions and data in a tamperproof manner. The instructions may include a secure microkernel and/or state machine/processor for booting the system to a known secure state, security related routines etc., including low level routines for use by the high-power system. The security data can comprise certificates, hashes and various keys.

In a security context, non-writable or read-only areas on the low power device may be used for the highest integrity level in the system. Recalling the Biba model, this means that no data can be written to it from lower integrity levels, while every process running at lower integrity levels can read from it. This functionality is readily implemented by Read Only Memories (ROMs) and the like. The low-power device may also provide storage or accommodate processes at lower integrity levels. This makes it possible to write certain data to clearly defined areas of the low-power device, using e.g. firmware implemented functions for reads and writes. With regards to integrity, Biba's rules, i.e. writings up are prohibited while writing down is permitted, should be strictly enforced. Implementing them in higher level software is cumbersome.

Similar functionality may be implemented with regards to confidentiality levels, where writing up is permitted and writing down is forbidden. Realizing that every level of confidentiality can read the lowest confidentiality level, at least some global data can be stored in ROMs of different kinds in the low-power device. Such public data may include an operating kernel or system functions and global public data. Other data may still be provided by a ROM, and thus simply cannot be modified by software, and yet have a high confidentiality level and thus should not be disclosed to any subject cleared for a lower confidentiality level. Such data include encryption keys, which would be useless if every process in the system could read them.

Some data within the highest integrity level can have a low confidentiality level, i.e. it can be read by every software component in the high-power system, e.g. kernel functions of various kinds. Other data within the highest integrity level, for example some keys for encryption, may have a higher confidentiality level and thus can only be read from software running at an appropriate confidentiality level and a lower integrity level.

The interface unit 200 provides an interface between the low-power system 100 and the high-power system 300. If, for example, a secure microkernel is used to boot the low-power system to a known secure state, the interface unit 200 would be responsible for passing control to an operating environment and/or hypervisor system running on the high power system once the secure state is obtained. The interface may also be responsible for passing security related routines and/or data from the tamper proof low-power device to software running on the high-power system. In some embodiments, the interface unit 200 may even be responsible for passing control from software running on the high-power system 300 to low level routines running on the low-power device 100. Such routines could be 'tamperproof' in the sense that they cannot be modified without physical access to the low-power device in order to plug in an interface for HW-programming, as well as equipment for hardware programming.

In FIG. 1 the horizontal arrows illustrate that parts of the low-power device 100 may communicate directly with parts in the high power system 300 through the interface unit 200. The vertical arrows illustrate that the low-power device 100, the interface unit 200 and the high-power system 300 may communicate with each other and with the peripheral units 500.501 through the bus 400. The bus 400 represents, for example, a system bus of a kind normally used to connect the processors, RAM and other devices within a typical computer, and also serial buses like USB. The schematic peripherals 500 and 501 represent all known peripherals used in a computer system. This includes, but is not limited to keyboards, mice, displays and printers. A card reader for a smart card connected through a USB-bus as described in the introduction would hence also be represented schematically by a peripheral 500 connected through the bus 400 in FIG. 1.

One basic idea of the invention is to provide a low-power device containing data and processes/functions that are kept isolated by hardware. The data and processes can be assigned any combination of available integrity and confidentiality levels. Examples of data and processes fit for the low-power device include encryption keys at a high integrity level and a high confidentiality level and kernel code at a high integrity level and low confidentiality level. However, an entire operating environment running on a virtual machine may be assigned a low integrity level, meaning that it is not permitted to write anything to the higher integrity levels of the low-power device. In principle, it can still write to the low-power device, but only to restricted areas with a similarly low integrity level.

In order to implement the necessary hardware and/or firmware for the low-power device, one or more integrity levels to be implemented on the low-power device must be determined. This would typically be the highest integrity level available, and possibly a few more. For each integrity level i, the various available confidentiality levels must be determined, thus making a set of pairs of integrity levels i and confidentiality levels j to be implemented in the low-power-device. For each such pair {i, j}, two I/O functions must be considered in view or the BLP and Biba rules discussed previously. Possible I/O-functions are:

READ(i, j) permitted to read information at or above integrity level i AND at or below confidentiality level j; and WRITE(i, j) permitted to write information to or below integrity level i AND to or above confidentiality level j.

Thus, only the read and write functions compliant with the BLP and Biba models are provided. It should be understood that equivalent functions controlling the flow of information along security axes may be provided. For example, one function could control information flow, i.e. reads and writes, along one security axis. Regardless of form, these I/O-functions are advantageously provided in hardware, so that the functions themselves cannot be altered by software. These functions, for example one READ and one WRITE for each pair as described above, may be provided by the interface 120 or software depending on the requirements associated with levels i and j.

As indicated above, other security aspects like availability, further integrity aspects etc. may be relevant. In general, n security aspects will require n-tuples of every possible combination.

In order to implement secure functions in the interface unit, the following general procedure would involve:
identifying a set of n security aspects, e.g. confidentiality, integrity and/or availability aspects, each aspect being independent of the other security aspects,
for each security aspect identifying one or more security levels to be implemented on the low-power device,
for each security aspect determining if and how information validly can be transported between security levels. There are three possibilities:
1. Flow upwards as in the BLP model for a security aspect of a confidentiality type,
2. Flow downwards as in the Biba model for a security aspect of an integrity type,
3. No flow between security levels permitted.

The fourth theoretical alternative, flow permitted in both directions along a security axis, is equivalent to all information being on one security level. To comply with the formal security models, information must not be transported from a higher to a lower level in a security aspect of the confidentiality type and not from a lower to a higher level in a security aspect of the integrity type. In addition, the BLP and Biba rules for joins of information from different levels must be employed accordingly.

This approach may quickly lead to a large number of separate functions. In the case of numerous security aspects it might be practical to run a generic READ-function at the highest possible confidentiality level and lowest possible integrity level (so that it can read everything). Such a trusted READ would have to take the assigned levels of the security aspects as argument, and implement the BLP and Biba-rules, preferably in hardware. A similar generic and trusted WRITE-function running at the lowest possible confidentiality levels and highest possible integrity levels could also be implemented.

In all cases, the read, write or flow functions and possibly functions enforcing the rules for joins between information from different levels preferably are implemented in the interface unit, which may be a part of a circuit board which also includes the low-power device.

Figure 2:
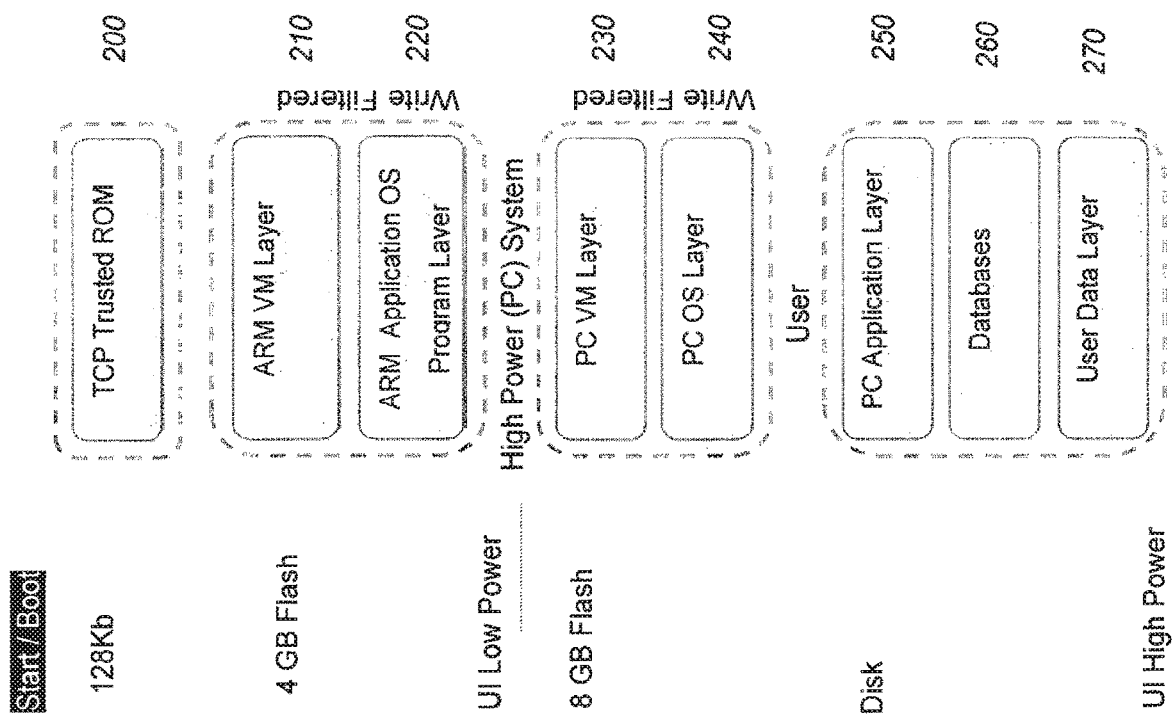
FIG. 2 illustrates functional components within the system of FIG. 1.

FIG. 2 shows an exemplary embodiment of the present invention. Trusted startup software is stored in read only memory (ROM) 200. The startup software may comprise a boot sequence for starting the entire system, or a startup routine for some secondary system that will be started later during initialization, for example basic routines for networking via TCP/IP. In any case, a ROM cannot be written to from any software, so the content within the ROM is tamperproof. In other words, storing some startup routine in the ROM 200 guarantees the authenticity of the startup routine, even if the system previously was infested with malicious software. The instructions and data in ROM 200 are stored at the highest integrity level, i.e. the most trusted level in a formal integrity model, where it cannot be written to by processes at lower integrity levels.

A low level virtual machine layer 210 can be stored in a larger memory area, e.g. a 4 GB flash memory area, of the low power system. During startup, the various components of the virtual machines can be verified by hashes or the like from ROM 200. The VM-machine layer may be assigned a lower integrity level than the contents of ROM 210. Because the VM-layer cannot write to the read only memory 200, writing from a lower to a higher integrity level is prevented by an electronic impossibility rather than by error-prone software. Thus, Biba's rule prohibiting writing up is observed automatically. According to the Biba model, writing data from a higher to a lower level of integrity is allowed. Hence, keys, hashes, instructions and other data may be read from the ROM 200 to verify startup of the virtual machine layer 210. Still according to the Biba model, a combination of information from two integrity levels shall be assigned the lower of the integrity levels. This means that the VM-layer when started keeps its integrity as long as it only receives data from its own or a higher integrity layer, e.g. ROM 200.

If this VM-layer is stored in a low-power device away from a high power PC 130, malicious software would have to pass the interface unit 120 in FIG. 1. Hence, if the interface unit 120 has no hardware or functionality for writing from the high-power system 130 to the VM-layer, the VM-layer is guaranteed to start from a certified and unaltered copy. This also means that any updates to the low-power device must be performed through a dedicated interface, for example a serial connection directly to the low-power device and not through a connection from the high-power system 130. This way, writes from a high power system 130 is impossible, and Biba's rule against writing up is once more observed. As Biba allows writing down, the virtual machines will still be available for running software on lower integrity levels. Because updates to the low power device will be relatively infrequent, users of secure computer systems are believed to prefer this minor inconvenience to the uncertainty of possible software attacks that might target a write function from the high power system 130 through the interface 120.

It is noted that some implementations may lack an interface for hardware programming, but simply provide a low-power device with preconfigured hardware and firmware containing the required data and functions.

In FIG. 2, one or more virtual machines 220 may be assigned for running application software on the low power device 110. This machine could, for example, run a web-browser and/or java-applications at a relatively high (trusted) integrity level. A possible application could be automatic secure transactions between computers having this known integrity level and a certificate to prove it. There are java implementations for single board computers that relatively easy might be adapted for this kind of applications.

Still referring to FIG. 2, the PC virtual machine layer provides a virtual machine, typically emulating the hardware of a typical PC. This layer runs on the high power system and typically provides (emulated) network interface card(s), printer(s), graphical processing unit(s) etc. in a manner known to those skilled in the art. An example of such a VM-layer is VM-ware™, although any virtual machine layer may be employed. This software layer is run at a lower integrity level than the low power device. Referring again to Biba's strict model of integrity, writing up to the low power device may be prevented by hardware in the interface unit 120 that simply lacks the ability to write up along the integrity axis, and/or by storing high-integrity data in a ROM, which cannot be written to. The low power device may still provide a virtual machine, or just data and/or instructions from ROM 200 to verify the PC VM-layer 230 in a secure manner as Biba allows writing information to a lower level of integrity.

A PC OS layer 240 runs on the PC virtual machine (VM) layer. While a software attack on a physical PC cannot write to a physical ROM, there is at least a theoretical possibility that an attack might target a virtual "ROM" emulated by software. Regardless if the VM software provides write filtering up to emulated ROMs or not, a lack of write functions through the interface unit 120 would prevent writes to higher integrity levels. More important, perhaps, is that hashes, keys etc. can be fetched from ROM 200 to verify software at runtime using known techniques discussed in the introduction, thus ensuring integrity at the level provided by a physical machine. The PC OS layer may have several internal levels of integrity, at least in principle.

A PC application layer 250 contains applications run by a user. This layer may also have several internal integrity levels. Recalling the discussion in the introduction, a trusted level of authentication may require a key or certificate from a read only memory (ROM) 200 or a smart card, whereas a less trusted level might require a password only. Such different levels of authentication are known from e.g. governmental systems and banking applications, and are used to ensure that only certified users are allowed to perform certain actions. Similarly, different levels of authenticity can be employed to ensure that non-trusted code cannot write outside the sandpit in which it is run.

It is well known to those skilled in the art that some operating systems and applications are more prone to software attacks and/or malware than other systems and applications. This may, at least in part, stem from not observing formal integrity rules, for example by allowing an applet or other code write from within a runtime machine in a web browser to a file system or applications outside the web browser. With the current invention, it is possible to run even rogue web browsers in a low cost virtual machine with a known level of integrity. This means that even if a web browser is suspected of allowing writes to a file system, such writes will be contained in an environment with untrusted contents, i.e. a low integrity level as defined above. Within this level, a user may disable cumbersome "enhanced security" functions, and still be reasonably sure that any software run within this particular machine will not be able to write to other virtual machines running at higher integrity levels. Various filters to prevent or warn of phishing and other attacks directed to a user will still be required. Anti virus software may also be required on this virtual machine to help prevent worms etc. from spreading from a totally uncontrolled machine connected to the Internet. However, the protection against viruses, worms and other malware writing to business critical applications may be greatly reduced by running such applications in a separate virtual machine at a higher, that is, more trusted and trustworthy, integrity level.

A database 260 is used as an example of data at a higher integrity level. According to Biba's strict policy of integrity, data should not be written to the database from a lower integrity level, for example the untrusted web browser environment described above. However, data may still be validly received over the Internet from other applications run at the same or a higher integrity level. The appropriate keys and/or certificates to ensure that data are not manipulated in transit can be retrieved from the ROM 200 as described above. Further, the machine running an insecure web browser and the virtual machine running the more trusted database may derive their required authenticity from keys or certificates stored in a physical ROM 200 on the low power device as described above. By involving hardware this way, the system becomes more robust than a purely software based system. The cost of a read only memory 200 will also be considerably less than equivalent functionality implemented in software, especially as the software must be certified more thoroughly to verify that it complies with the Biba rules for integrity. However, it should be kept in mind that other parts of the software required to run a trusted application in a separate machine, e.g. verification by comparing a runtime hash with a stored hash, will be similar in the two approaches.

According to Biba, writing down is allowed. In the example above, this means that data from a trusted database can be written to the virtual machine running the web browser without violating Biba's rule for writing. The combined information would acquire the lower integrity level, i.e. it should be regarded as less trusted than the original data from the database running at a lower integrity level. However, such writing down should be discouraged, because it would lead to information migrating to the highest integrity level where it might be stuck: Writing it back is prevented, possibly by a mechanism involving hardware as discussed above.

Bell-LaPadula rules may be implemented in hardware in much the same way as Biba's rules for integrity. Data should be kept at the lowest possible confidentiality level to prevent information from migrating to the highest available level of confidentiality.

As noted above, different aspects of security, e.g. confidentiality, integrity and availability, are independent of each other. Thus, if there are two levels of integrity, e.g. {low, high} and two levels of confidentiality, e.g. {public, restricted} there could be four different virtual machines running {low, public}, {low, restricted}, {high, public] and {high, restricted} respectively.

Turning once more to FIG. 2, the user data layer 270 presents one or more security levels, for example the four combinations above running on separate virtual machines, on one display. This way, a user can view data from a trusted and trustworthy database on a high integrity level while working in a less trusted environment on a lower level of integrity. If data from the lower and higher integrity layers are not mixed, there will be no combination of information that has to be assigned the higher level of integrity. Hence, the information will not migrate to the highest level of integrity.

No system will be more secure than the user using it. A user can read from one window and type into another, possibly via a slip of paper if the systems are wide apart. This sets a limit to the effort that may reasonably be put into an attempt to prevent copy and paste between two windows on a computer screen. It also means that as little as possible regarding security should be left to a user.

Figure 3:
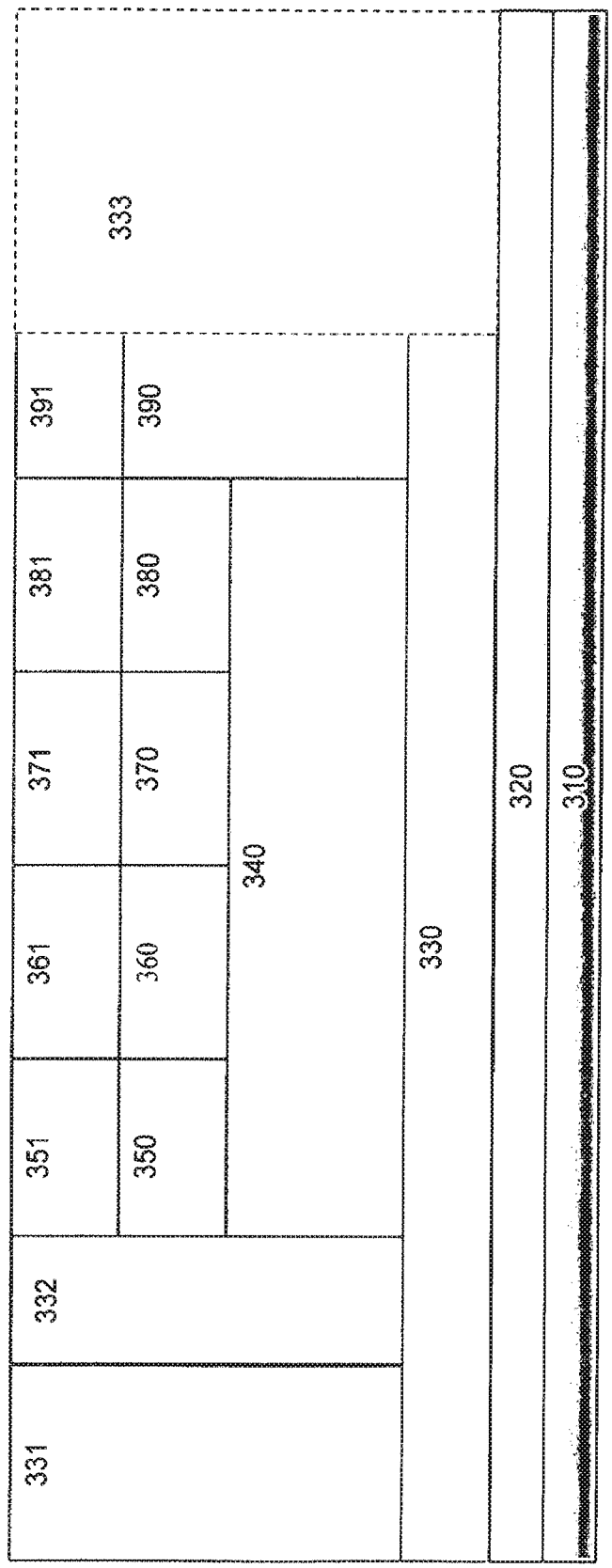
FIG. 3 illustrates a possible software architecture for use on the system.

Referring now to FIG. 3, a schematic example of software applications that might be run on the system is shown. Starting from the bottom, a hardware layer 310 represents the low-power device, high-power device, interface unit and other hardware from FIG. 1.

The layer 320 running directly over the hardware 310 may represent a hypervisor, e.g. the VM layer 210 and PC VM-layer 250 from FIG. 2, a hardware abstraction layer for a single operating system, or no software at all. The hypervisor 320 may provide several virtual machines 330, 333 for running applications at different levels of confidentiality, integrity and availability. A virtual machine may thus use resources from the low power device, the high-power device or both. In FIG. 3, only one virtual machine is depicted in some detail. A typical virtual machine has an operating system (OS) 330, which serves as a basis for all applications running on the system. Some applications 331, 332 may access the OS 330 directly. Other applications may share a common set of libraries and drivers 340, typically providing a file system, a file system browser, printing, networking and other functions that are implemented once to be available in a number of applications 350-381, for example email 350 and email based services 351, browser/xml app 360 with corresponding services 361, contact list and services 370, 371, IRS and IRS related services or social media 370, 371 etc. Some applications 390, 391, e.g. java runtime environment 390 and applet 391, can be required to run in a sandpit provided by the operating system, if such functionality is provided by the OS. Not all virtual machines may implement all the functions shown in FIG. 3.

The hypervisor 320 may accommodate one or more additional virtual machines, collectively indicated by the dotted box 333. One of these might, for example, be a separate machine running at a high level of integrity. In this context, it is irrelevant if it uses processing power from the high-power device or, as discussed above, the low-power device. In either case, such a virtual machine might run, for example, accounting software and communicate with other computers at the same integrity level only. This could mean that any piece of information from a lower level of integrity would be rejected by the machine, and hence that a user would be unable to use this particular machine for, e.g., browsing the web. Because information with low integrity, i.e. any non-authenticated web content, can be written to the higher integrity level, attacking this particular machine with malware would be made difficult, because the attacker must authenticate himself, typically by a certificate, and then provide data with an appropriate hash depending on a valid key or certificate in order to write to the machine at all. As mentioned briefly in the introduction, algorithms for such purposes, e.g. streaming algorithms, exist. The present invention can support such applications by providing a platform with a known, traceable and verifiable integrity level. If desired, an entire stack from and including hardware isolated from other virtual machines can be provided by the present invention.

In practice, inexpensive disks and other hardware connected to a high-power device would be used as much as possible. The hypervisor 320 might still be used to allocate security resources from the low power device along with resources from the high-power device to virtual machines running on the system.

Thus, for example, it may be possible to store, possibly encrypted and hashed, code on a hard disk connected to the high-power device, and use integrity tested and decrypted code to boot a virtual machine running at the high-power device along with a virtual machine running on the low power device as discussed in the description of FIG. 2. These machines may have similar or different levels of confidentiality, integrity and/or availability.

In some embodiments, the layer 320 might also be responsible for providing copies of virtual machines for fast recovery. This functionality is provided by commercially available hypervisors, and will not be described further here.

From FIG. 3, it should be understood that reads or writes initiated by some user application, e.g. 351, are mapped through one or more software layers, in this case layers 350, 340, 330 and 320 before they access the physical disk, networking interface or other hardware at layer 310. Although the operating system 330 and hypervisor 320 may provide some protection, they generally do not implement formal rules for integrity and confidentiality as discussed above. Hence, there is at least a possibility for circumventing security through software accessing disks and other hardware which is physically available through the hypervisor 320 in FIG. 3. However, when secure hardware according to the invention is provided by the low-power device and properly allocated to resources at the OS or application layer, possibly through a hypervisor 320 as shown in FIG. 3, resources can be run securely at different levels of confidentiality and integrity within the system. This includes start up with no possibility for contamination during the boot-processes and provision of storage at appropriate levels during operation.

It should be understood that hardware implemented secure I/O-functions and storage can be allocated to entire virtual machines through a hypervisor 320, and/or to application software through an appropriate OS.

Concluding Remarks

From the above, it should be understood that any information, e.g. a unique ID and the keys, code and hashes discussed above, may be stored at an appropriate level, not necessarily at the highest possible integrity level. Further, some code may be stored at the level on which it is to be run, while a hash of the code may be stored at a higher integrity level. This ensures that the hash cannot be modified (by writing up) and that it may still be available for comparison before the code is allowed to run.

In the above discussion, several security aspects have been mentioned, while confidentiality and integrity (authenticity) has been used as main examples. However, it should be clearly understood that availability and other aspects may benefit from the present invention. For example, backups or older versions of certain virtual machines may be kept more or less available for fast restore of data and functionality. Furthermore, some copies of virtual machines, backups and other data may be encrypted and then provided with a hash according to their confidentiality and integrity levels and stored at less restrictive levels, i.e. at less expensive storage. During restore, a hash can be computed from the stored data and compared to a hash stored at the higher integrity level where it originally belonged. If the hashes are different, the restored information should be rejected from the higher integrity level. Next, the data can only be decrypted by a process at an appropriate confidentiality level using a key from a confidential memory. The information is then only available when decrypted, i.e. at the appropriate integrity level and at the appropriate confidentiality level. In these security related processes, the low-power device may provide storage for keys and hashes, and possibly for code, whereas the high-power device may provide inexpensive processing power and storage.

While the invention has been described with reference to specific embodiments, the invention is solely defined by the accompanying claims.

The invention claimed is:

1. A system comprising:
    a virtual machine engine for generating one or more virtual machines, each virtual machine being generated having a virtual machine confidentiality level and a virtual machine integrity level, the virtual machine confidentiality level being selected from at least a higher confidentiality level and a lower confidentiality level, the virtual machine integrity level being selected from at least a higher integrity level and a lower integrity level, a first virtual machine with the higher confidentiality level being configured to require a stronger confidentiality process than a second virtual machine with the lower confidentiality level, a third virtual machine with the higher integrity level being configured to require a stronger integrity process than a fourth virtual machine with the lower integrity level;
    a first program;
    a second program;
    a first datastore or data set associated with a first data confidentiality level and a first data integrity level;
    a second datastore or data set associated with a second data confidentiality level and a second data integrity level;
    at least one hardware processor configured to:
        receive a request to use the first program;
        execute a particular virtual machine with a particular virtual machine confidentiality level and a particular virtual machine integrity level;
        use a particular confidentiality process and a particular integrity process before or while operating the first program by the particular virtual machine, the particular confidentiality process being associated with the particular virtual machine confidentiality level, the particular integrity process being associated with the particular virtual machine integrity level; and
        allow the first program to write to the first datastore or data set, only if the first data confidentiality level is equal to or higher than the particular virtual machine confidentiality level, and only if the first data integrity level is equal to or lower than the particular virtual machine integrity level.

2. The system of claim 1, wherein the stronger confidentiality process includes more secure encryption.

3. The system of claim 2, wherein the first virtual machine with the higher confidentiality level requires encryption using a larger key length than the second virtual machine with the lower confidentiality level.

4. The system of claim 2, wherein the first virtual machine with the higher confidentiality level requires encryption, and the second virtual machine with the lower confidentiality level does not require encryption.

5. The system of claim 2, wherein the first virtual machine with the higher confidentiality level requires at least one additional level of encryption over the second virtual machine with the lower confidentiality level.

6. The system of claim 1, wherein the stronger integrity process includes more secure authentication.

7. The system of claim 6, wherein the third virtual machine with the higher integrity level requires authentication using a certificate, and the fourth virtual machine with the lower integrity level requires a password.

8. The system of claim 6, wherein the third virtual machine with the higher integrity level requires authentication, and the fourth virtual machine with the lower integrity level does not require authentication.

9. The system of claim 6, wherein the third virtual machine with the higher integrity level requires using a hash, and the fourth virtual machine with the lower integrity level does not require using a hash.

10. The system of claim 1, further comprising protected memory storing security keys, the protected memory having a protected memory confidentiality level and a protected memory integrity level; and wherein the first virtual machine with the higher confidentiality level requires a first one of the security keys stored in the protected memory, and the third virtual machine with the higher integrity level requires a second one of the security keys stored in the protected memory.

11. The system of claim 10, wherein the protected memory is disposed on a first computing device, and the first program is controlled by a second computing device.

12. The system of claim 11, wherein the protected memory is read-only memory.

13. The system of claim 1, wherein the at least one hardware processor is further configured to:
    allow the first program to receive data from the second program, only if a second virtual machine confidentiality level associated with the second program is equal to or higher than the particular virtual machine confidentiality level, and only if a second virtual machine integrity level associated with the second program is equal to or lower than the particular virtual machine integrity level; and
    allow the first program to provide data to the second program, only if the second virtual machine confidentiality level associated with the second program is equal to or higher than the particular virtual machine confidentiality level, and only if the second virtual machine integrity level associated with the second program is equal to or lower than the particular virtual machine integrity level.

14. The system of claim 1, wherein the particular virtual machine confidentiality level and the particular virtual machine integrity level are based on the first program.

15. A method comprising:
    receiving a request to use a first program;
    generating and executing a particular virtual machine with a particular virtual machine confidentiality level and a particular virtual machine integrity level, the particular virtual machine confidentiality level being selected from at least a higher confidentiality level and a lower confidentiality level, the particular virtual machine integrity level being selected from at least a higher integrity level and a lower integrity level, a first virtual machine with the higher confidentiality level requiring a stronger confidentiality process than a second virtual machine with the lower confidentiality level, a third virtual machine with the higher integrity level requiring a stronger integrity process than a fourth virtual machine with the lower integrity level;

using a particular confidentiality process and a particular integrity process before or while operating the first program by the particular virtual machine, the particular confidentiality process being associated with the particular virtual machine confidentiality level, the particular integrity process being associated with the particular virtual machine integrity level; and allowing the first program to write to the first datastore or data set, only if the first data confidentiality level is equal to or higher than the particular virtual machine confidentiality level, and only if the first data integrity level is equal to or lower than the particular virtual machine integrity level.

16. The method of claim 15, wherein the stronger confidentiality process includes more secure encryption.

17. The method of claim 16, wherein the first virtual machine with the higher confidentiality level requires encryption using a larger key length than the second virtual machine with the lower confidentiality level.

18. The method of claim 16, wherein the first virtual machine with the higher confidentiality level requires encryption, and the second virtual machine with the lower confidentiality level does not require encryption.

19. The method of claim 16, wherein the first virtual machine with the higher confidentiality level requires at least one additional level of encryption over the second virtual machine with the lower confidentiality level.

20. The method of claim 15, wherein the stronger integrity process includes more secure authentication.

21. The method of claim 20, wherein the third virtual machine with the higher integrity level requires authentication using a certificate, and the fourth virtual machine with the lower integrity level requires a password.

22. The method of claim 20, wherein the third virtual machine with the higher integrity level requires authentication, and the fourth virtual machine with the lower integrity level does not require authentication.

23. The method of claim 20, wherein the third virtual machine with the higher integrity level requires using a hash, and the fourth virtual machine with the lower integrity level does not require using a hash.

24. The method of claim 15, further comprising storing security keys in protected memory, the protected memory having a protected memory confidentiality level and a protected memory integrity level; and wherein the first virtual machine with the higher confidentiality level requires a first one of the security keys stored in the protected memory, and the third virtual machine with the higher integrity level requires a second one of the security keys stored in the protected memory.

25. The method of claim 24, wherein the protected memory is disposed on a first computing device, and the first program is controlled by a second computing device.

26. The method of claim 25, wherein the protected memory is read-only memory.

27. The method of claim 15, further comprising:

allowing the first program to receive data from a second program, the second program being associated with a second virtual machine having a second virtual machine confidentiality level and a second virtual machine integrity level, only if the second virtual machine confidentiality level associated with the second program is equal to or higher than the particular virtual machine confidentiality level, and only if the second virtual machine integrity level associated with the second program is equal to or lower than the particular virtual machine integrity level; and allowing the first program to provide data to the second program, only if the second virtual machine confidentiality level associated with the second program is equal to or higher than the particular virtual machine confidentiality level, and only if the second virtual machine integrity level associated with the second program is equal to or lower than the particular virtual machine integrity level.

28. The method of claim 15, wherein the particular virtual machine confidentiality level and the particular virtual machine integrity level are based on the first program.

* * * * *